3,531,293
ANIMAL FEED COMPOSITION
Werner R. Boehme, Somerville, N.J., assignor to Dawe's Laboratories, Inc., Chicago, Ill., a corporation of Illinois
No Drawing. Filed Oct. 20, 1966, Ser. No. 593,623
Int. Cl. A23k 1/00
U.S. Cl. 99—2                                14 Claims

ABSTRACT OF THE DISCLOSURE

A vitamin K animal food composition of improved stability comprising the additional product of menadione and a water soluble bisulfite salt and a non-toxic aci-reductone.

---

This invention relates to an improved composition of matter and more particularly to a vitamin K animal feed premix possessing improved stability.

The use of Vitamin K in animal feeds, especially those intended for poultry, has become generally accepted for the prevention of hemorrhagic disease. In combination with such coccidiostatic drugs such as sulfaquinoxaline and amprolium, Vitamin K exhibits a synergistic action against most of the common species of the *Eimeria parasite*, see S. F. M. Davies and L. P. Joyner, J. Comp. Path., 73, 379 (1963). Thus, the combination of Vitamin K and coccidiostatic drugs permits lower drug levels to be used without eliminating the development of natural immunity to the parasitic infection.

Vitamin K is customarily incorporated into animal feeds in the form of water soluble bisulfite addition product of menadione such as menadione sodium bisulfite, MSB, in amounts of 1 to 20 grams per ton of finished feed. The adducts of menadione and water soluble bisulfite salts, although stable in the pure dry state, are readily decomposed under a variety of conditions. For example, in a very dilute alkaline medium, menadione is at first precipitated from a solution of the adduct and the liberated menadione then undergoes further degradation. In the presence of heat and moisture or in dilute alkali, the bisulfite adducts of menadione are also rearranged to sulfonic acid derivatives which are devoid of Vitamin K activity. Sulfur dioxide is evolved in the presence of dilute acids. Air and moisture catalyze the decomposition to a variety of products which include hydraquinones, sulfates and highly colored quinhydrone-like complexes, accompanied by a loss of Vitamin K activity.

It has, therefore, become necessary to improve the stability of the menadione bisulfite adducts to make them useful as feed ingredients. D. V. Frost in U.S. Pat. No. 2,827,377, for example, has found that the addition of a large excess of a water soluble bisulfite salt stabilized the adducts in animal feed premixes. Day, et al., Feedstuffs 36, (33) 50, Aug. 15, 1964 and Galler, U.S. Pat. No. 3,079,260 showed that further stabilization could be achieved by incorporating an acidifying agent.

Menadione sodium bisulfite, as used in animal feeds is usually stabilized by the addition of an excess of sodium bisulfite. This composition, known in the trade as menadione sodium bisulfite complex or MSBC, consists of approximately 63% menadione sodium bisulfite, U.S.P. and 37% sodium bisulfite, or a molar ratio of menadione sodium bisulfite, U.S.P. to sodium bisulfite of about 1:2.

The presence of excess of sodium bisulfite in MSBC, although improving the stability of the adduct, exerts a highly destructive effect upon a number of important and costly feed ingredients. It is known, for example, that thiamine is rapidly destroyed by the salts of sulfurous acid (R. R. Williams, et al.), J.A.C.S., 57, 229, 536 (1935). The detrimental effects of sulfites upon thiamine have also been recognized by governmental and trade regulatory agencies. Thus, the Federal Food and Drug Administration (21 C.F.R. 121.101) has specifically prohibited the use of sodium bisulfite in recognized sources of Vitamin $B_1$. Furthermore, the Association of American Feed Control Officials states that sulfur dioxide, sulfurous acid, and salts of sulfurous acid "when used in or on animal products or mixed feeds containing animal products, are considered deleterious and shall constitute adulteration under Section 7(a) of the Uniform State Bill." (Official Publication, Association of American Feed Control Officials, Inc.

Amprolium, one of the most effective coccidiostatic drugs, is also destroyed rapidly by the excess of sodium bisulfite of MSBC.

I have found that the stability of the addition product of menadione and water soluble bisulfite salts is markedly improved by the incorporation of a small amount of an aliphatic or alicyclic aci-reductone.

The aci-reductones are a class of keto-enediols characterized by the grouping:

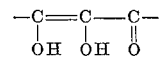

or its tautomeric forms.

In contrast to the 2 molar excess of sodium bisulfite used in commercial MSBC, only a small fraction of a mole of an aci-reductone suffices to effectively stabilize menadione sodium bisulfite, U.S.P.

The following embodiments of this invention are given to illustrate the effectiveness of aci-reductones in improving the stability of Vitamin K in animal premixes.

EXAMPLE I

Stability of Vitamin K premixes under pelleting conditions

A conventional corn-wheat-soy poultry feed mash (20% protein) was blended to yield, (a) 140 gms. per ton of MSB plus 14 gms. per ton of sodium erythorbate, (b) 220 gms. per ton of MSBC and (c) 220 gms. per ton MSBC plus 220 gms. per ton of monocalcium phosphate. Samples were conventionally steamed at a pressure of 7.5 pounds for 1.5 minutes and pelleted by passing through a suitable die.

The pellets were analyzed for menadione sodium bisulfite (MSB) by a spectrophotometric procedure which gives an intense blue color with an absorption maximum at 570 m$\mu$ in the presence of ethyl cyanoacetate and ammonia. This color, which is due to the formation of a methylene quinhydrone, is produced in the presence of alkali by most alpha naphthoquinones having an unsubstituted beta position with substances containing active methylene groups, (W. R. Boehme, Dissertation, University of Maryland, 1948; E. F. Pratt & W. R. Boehme, J.A.C.S., 73, 444 (1951)).

TABLE A

Retention of Vitamin K

|  | Percent |
|---|---|
| (a) MSB plus sodium erythorbate | 82 |
| (b) MSBC | 72 |
| (c) MSBC plus monocalcium phosphate | 73 |

The illustrative Example A above has a weight ratio of aci-reductone to MSB of 1 to 10 or a molar ratio of about 1 to 60.

EXAMPLE II

The effect of varying amounts of sodium erythorbate on vitamin K stability

Table B below demonstrates the stabilizing effect upon MSB of ratios of aci-reductone in the range of 1:2 to 1:100, under the conditions set forth in Example I.

TABLE B

| Sodium erythorbate; percent by wt. of added MSB in premix: | Percent retention of vitamin K |
|---|---|
| 50 | 88 |
| 25 | 85 |
| 10 | 82 |
| 5 | 77 |
| 2 | 73 |

EXAMPLE III

Effect of aging upon vitamin K multiple feed premixes in the presence of aci-reductones A plurality of representative aci-reductones were added to a conventional animal feed premix containing vitamins and minerals (Dawe's Microfac Poultry Fortifier) to obtain the stabilization effect thereon. The samples were stored at room temperature and assayed after periods of 14, 60 and 90 days. The results are set forth in the following Table C.

TABLE C

| Concentration per pound of premix | Percent menadione after— | | |
|---|---|---|---|
| | 14 days | 60 days | 90 days |
| 2 gms. MSBC (1.26 gms. MSB plus .74 gms. sodium bisulfite) | 100 | 85 | 68 |
| 2 gms. menadione dimethylpyromidinol bisulfite | 98 | 85 | 65 |
| 2 gms. menadione dimethylpyridinol bisulfite plus 0.2 sodium erythorbate | 100 | 90 | 85 |
| 1.26 gms. MSB plus 0.2 gms. sodium erythorbate | 98 | 90 | 85 |
| 1.26 gms. MSB plus 0.2 gms. triose reductone | 100 | 91 | 85 |
| 1.25 gms. MSB plus 0.2 gms. 3,4-dihydroxy tetrone | 100 | 90 | 83 |

EXAMPLE IV

Stabilization of vitamin K in pelleted feed in the presence of various aci-reductones The stabilizing effect of aci-reductones was demonstrated by using a commercial animal feed mash containing 125 gms. per ton of menadione sodium bisulfite, a typical addition product of menadione and a water soluble bisulfite salt.

The following Table D lists the results using various aci-reductones in pelleted feed.

TABLE D

| Composition per ton of feed: | Percent MSB retained |
|---|---|
| 199 gms. MSBC (125 gms. MSB plus 74 gms. NaHSO$_3$) | 72 |
| 125 gms. MSB plus 12.5 gms.: | |
|   Triose reductone | 85 |
|   Dimethyl reductone | 80 |
|   Na reductinate | 80 |
|   Ca dihydroxyacrylate | 85 |
|   Diethyl dihydroxymaleate | 84 |
|   3,4-dihydroxytetrone | 80 |
|   Ca erythorbate | 85 |
|   Na erythorbate | 83 |
|   Hydroxydimedone | 79 |
|   Ca ascorbate | 85 |

EXAMPLE V

Stability of thiamine in aqueous solution in the presence of vitamin K and sodium erythorbate An aqueous solution (a) 1% thiamine hydrochloride; (b) 1% thiamine hydrochloride plus 0.63% MSB plus 0.063% sodium erythorbate; (c) 1% thiamine hydrochloride plus 1% MSBC; and (d) 1% thiamine hydrochloride, 1% MSBC and 1% monocalcium phosphate were aged in capped bottles at 30° C. for five days in semi-darkness. The solutions were analyzed for thiamine by a modification of the method of Hayden and Elkington (Analyst, 82, 650 (1957)). This procedure is based on the formation of a yellow color with an absorption maximum at 430 m$\mu$ in the presence of 6-aminothymol and alkali.

TABLE E

| Aqueous compositions: | Percent thiamine retention |
|---|---|
| (a) No added vitamin K | 81 |
| (b) MSB plus sodium erythorbate | 86 |
| (c) MSBC | 15 |
| (d) MSBC plus monocalcium phosphate | 15 |

These results show that thiamine and MSB are compatible, that MSB containing excess sodium bisulfite exerts a highly destructive action upon thiamine and that MSB containing sodium erythorbate appears to exert a protective action on thiamine.

EXAMPLE VI

Stability of thiamine hydrochloride in the presence of vitamin K under pelleting conditions This example compares the effect upon thiamine hydrochloride of MSB containing an aci-reductone with that of MSB containing excess sodium bisulfite in pelleted animal feed. A corn-wheat-soy mash (20% protein) containing 40 gms. of thiamine hydrochloride per ton was prepared. Samples of this mash were each blended to obtain (a) 12.6 gms. of MSB per ton plus 1.26 gms. of sodium erythorbate per ton, (b) 20 gms. of MSBC per ton (containing 12.6 gms. of MSB per ton plus 7.4 gms. of sodium bisulfite per ton), (c) 20 gms. of MSBC per ton plus 20 gms. of monocalcium phosphate per ton, (d) thiamine hydrochloride mash without added vitamin K.

Equal amounts by weight of each blend, including the sample of the thiamine hydrochloride mash without added vitamin K, were autoclaved at 7.5 lbs. steam pressure for 1.5 minutes and extruded through a 7/32" die plate. The pellets were dried and analyzed for retained thiamine.

TABLE F

Thiamine retention

| | Percent |
|---|---|
| (a) MSB plus sodium erythorbate | 99 |
| (b) MSBC | 73 |
| (c) MSBC plus monocalcium phosphate | 75 |
| (d) Without added Vitamin K | 94 |

These results show that about 6 percent of the added thiamine is lost during the pelleting of feed containing no added Vitamin K, that MSBC causes a loss of 23–25% of the added thiamine, and that MSB plus sodium erythorbate exerts a protective action upon thiamine.

EXAMPLE VII

Stability of amprolium in aqueous solution in the presence of vitamin K and sodium erythorbate An aqueous of solution (a) 1% amprolium, (b) 1% amprolium plus 0.63% MSB plus 0.063% sodium erythorbate; (c) 1% amprolium plus 1% MSBC; (d) 1% amprolium plus 1% MSBC plus 1% monocalcium phosphate were aged in capped bottles at 30° C. for five days in semi-darkness.

The solutions were analyzed for amprolium by the A.C.A.C. method of October, 1961, part II, procedure for premixes. This method is based upon the formation of a rose color with an absorption maximum at 530 m$\mu$ in the presence of amprolium, 2,7-naphthalenediol and alkaline potassium ferricyanide.

TABLE G

Retention of amprolium

| | Percent |
|---|---|
| (a) No added Vitamin K | 90 |
| (b) MSB plus sodium erythorbate | 10 |
| (c) MSBC | 7 |
| (d) MSBC plus monocalcium phosphate | 9 |

EXAMPLE II

Stability of amprolium in the presence of vitamin K under pelleting conditions

A corn-wheat-soy mash (20% protein) containing (a) 1% amprolium, (b) 1% amprolium plus 0.63% MSB plus 0.063% sodium erythorbate, (c) 1% amprolium plus 1% MSBC, (d) 1% amprolium plus 1% MSBC plus 1% monocalcium phosphate, was steamed and pelleted as outlined above. High levels of amprolium were selected for this experiment because of the greater complexity in analyzing low concentrations of amprolium in feeds. The results are set forth in Table H.

TABLE H

Retention of amprolium

| | Percent |
|---|---|
| (a) No added Vitamin K | 96 |
| (b) MSB plus sodium erythorbate | 100 |
| (c) MSBC | 79 |
| (d) MSBC plus monocalcium phosphate | 83 |

In general, aliphatic and alicyclic aci-reductones were found to be stabilizing agents for MSB.

The operable aliphatic aci-reductones may be represented by the following structural formula:

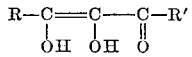

wherein R is selected from the group consisting of hydrogen, lower alkyl groups, mono or polyhydroxy substituted lower alkyl and carboxyl groups, and R' is selected from the group consisting of hydrogen, lower alkyl, hydroxy and lower alkoxyl groups and their equivalent salts, esters and lactones.

The operable alicyclic aci-reductones may be represented by the following structural formula:

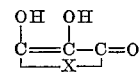

wherein X is selected from the group consisting of lower alkylene, mono or polyhydroxy substituted lower alkylenes and their equivalent salts, esters and lactones.

What is claimed is:

1. A Vitamin K animal feed premix having improved stability to air, heat, moisture, acid and dilute alkali solution in which said premix contains at least 2 grams per pound of a menadione bisulfite adduct of menadione and a water soluble bisulfite and from 2 to about 50 percent by weight of a non-toxic aci-reductone based upon the amount of said menadione bisulfite.

2. The composition of claim 1 wherein the aci-reductone is selected from the group consisting of aliphatic aci-reductones and alicyclic aci-reductones and their equivalent salts, esters and lactones.

3. The composition of claim 2 wherein the aliphatic aci-reductone has the structural formula:

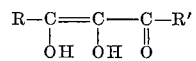

wherein R is selected from the group consisting of hydrogen, lower alkyl groups, mono or polyhydroxy substituted lower alkyls and carboxyl groups; R' is selected from the group consisting of hydrogen, lower alkyl, hydroxy and lower alkoxyl groups and their equivalent salt, esters and lactones.

4. The composition of claim 2 wherein the alicyclic aci-reductone has the structural formula:

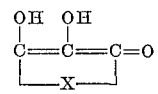

wherein X is selected from the group consisting of lower alkylenes, mono or polyhydroxy substituted lower alkylenes and their equivalent salts, esters and lactones.

5. The composition of claim 3 wherein the aliphatic aci-reductone is sodium erythorbate.

6. The composition of claim 3 wherein the aliphatic aci-reductone is calcium dihydroxy acrylate.

7. The composition of claim 3 wherein the aliphatic aci-reductone is diethyl dihydroxy maleate.

8. The composition of claim 3 wherein the aliphatic aci-reductone is calcium erythorbate.

9. The composition of claim 3 wherein the aliphatic aci-reductone is calcium ascorbate.

10. The composition of claim 5 containing about 2 to 50 percent by weight triose reductone.

11. The composition of claim 6 containing about 2 to 50 percent by weight of calcium dihydroxy acrylate.

12. The composition of claim 7 containing about 2 to 50 percent by weight of diethyl dihydroxy maleate.

13. The composition of claim 8 containing about 2 to 50 percent by weight of calcium erythorbate.

14. The composition of claim 9 containing about 2 to 50 percent by weight of calcium ascorbate.

References Cited

UNITED STATES PATENTS

| | | | |
|---|---|---|---|
| 2,159,986 | 5/1939 | Gray et al. | 99—163 |
| 2,183,053 | 12/1939 | Taylor | 99—11 |
| 2,795,503 | 6/1957 | Dunshee et al. | 99—139 |
| 2,806,794 | 9/1957 | Hodge et al. | 99—163 |
| 2,808,361 | 10/1957 | Bavouset | 424—280 XR |
| 2,815,314 | 12/1957 | Hale | 424—331 |
| 2,935,449 | 5/1960 | Bavley et al. | 99—163 XR |
| 3,196,018 | 7/1965 | Galler | 99—2 |

OTHER REFERENCES

Merck Index, Seventh ed., Merck and Co., Rathway, N.J., 1960, pp. 106–107, 190, 643 and 644.

MAURICE W. GREENSTEIN, Primary Examiner

U.S. Cl. X.R.

99—4; 424—331

UNITED STATES PATENT OFFICE

CERTIFICATE OF CORRECTION

Patent No. 3,531,293                Dated September 29, 1970

Werner R. Boehme

It is certified that error appears in the above-identified patent and that said Letters Patent are hereby corrected as shown below:

Col. 6, lines 16-19, correct the formula to read:

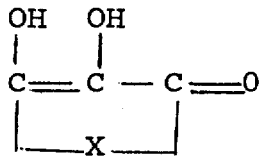

SIGNED AND SEALED
DEC 22 1970

(SEAL)
Attest:

Edward M. Fletcher, Jr.
Attesting Officer

WILLIAM E. SCHUYLER, JR.
Commissioner of Patents